US007336402B2

(12) United States Patent
Moritaku

(10) Patent No.: US 7,336,402 B2
(45) Date of Patent: Feb. 26, 2008

(54) IMAGE READING APPARATUS

(75) Inventor: Toshimitsu Moritaku, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 973 days.

(21) Appl. No.: 10/416,594

(22) PCT Filed: Dec. 14, 2001

(86) PCT No.: PCT/JP01/10997

§ 371 (c)(1),
(2), (4) Date: Dec. 2, 2003

(65) Prior Publication Data

US 2004/0070797 A1 Apr. 15, 2004

(30) Foreign Application Priority Data

Dec. 14, 2000 (JP) ............................ 2000-380763

(51) Int. Cl.
*H04N 1/04* (2006.01)
*H04N 1/00* (2006.01)

(52) U.S. Cl. ...................... 358/474; 358/483; 358/445; 358/444; 358/463; 358/443; 358/497

(58) Field of Classification Search ................ 358/497, 358/494, 474, 471, 483, 482, 443, 445, 444, 358/463, 468, 505, 512–514; 250/208.1, 250/234–236, 216; 713/500–503, 330–340; 348/372

See application file for complete search history.

(56) References Cited

U.S. PATENT DOCUMENTS 6,958,830 B2 * 10/2005 Kono ......................... 358/443
7,119,933 B2 * 10/2006 Sugimoto ................... 358/474
7,170,651 B2 * 1/2007 Okamura .................... 358/474

FOREIGN PATENT DOCUMENTS

| | | |
|---|---|---|
| JP | 6-14187 | 1/1994 |
| JP | 8-289083 | 11/1996 |
| JP | 11-146116 | 5/1999 |
| JP | 2000-287010 | 10/2000 |

OTHER PUBLICATIONS

Japanese Office Action (mailed Feb. 6, 2006).

* cited by examiner

*Primary Examiner*—Cheukfan Lee
(74) *Attorney, Agent, or Firm*—John J. Penny, Jr.; Edwards Angell Palmer & Dodge LLP

(57) ABSTRACT

Since a power supply circuit for a controller (31) and a power supply circuit for a buffer storage unit (32) are independently provided, the power voltage for the buffer storage unit (32) need only be reduced to obtain a corresponding reduction in the amplitude of the signal waveform of digital image data transmitted along an FFC (40), without the operation of the controller (31) being adversely affected. In addition, so long as a coil (47) is located at one position in the internal power supply circuit of a control chip (24), or the external circuit thereof near its power supply circuit, the signal waveform for the digital image data transmitted along the FFC (40) can be attenuated.

8 Claims, 4 Drawing Sheets

41
45
IMAGE PROCESSING ASIC
44
MICROCOMPUTER
40
FFC
48
39
38
37
33
47
35
34
36
32
OUTPUT BUFFER
25
A/D
CCD
CONTROLLER
22
24
31

IMAGE READING APPARATUS

BACKGROUND OF THE INVENTION

The present invention relates to an image reading apparatus, and relates in particular to an EMI (Electro Magnetic Interference) countermeasure therefor.

Image reading apparatuses, such as image scanners and facsimile machines, are well known as digital image input apparatuses that for use are now closely associated with computers. Concurrently, as the development of the computers with which they are now generally employed has continued, the reading speeds attained by these image reading apparatuses have been increased, year after year.

As is shown in FIG. 4, for a conventional flatbed image scanner, a CCD 22, an A/D converter 25 and a buffer 28 are provided for a carriage 20, and an image processing ASIC 52, which incorporates a controller 51 for generating control signals for the CCD 22 and the A/D converter 25, is provided for a main substrate 41 that is fixed to a case 11. The image processing ASIC 52 is connected to the CCD 22, the A/D converter 25 and the buffer 28 by a flexible flat cable (hereinafter referred to as an FFC) several tens of centimeters in length. Since for this conventional flatbed scanner configuration the path provided by the FFC for the transmission of digital image data signals is very long, it is an acknowledged fact that appropriate EMI (ElectroMagnetic Interference) countermeasures are required for the FFC.

However, to reduce the EMI that accompanies the transmission of digital image data along the FFC, EMI countermeasures must be taken for the individual FFC data lines by providing a resistor for each of them, and this provision of EMI countermeasures would increase the overall unit cost.

SUMMARY OF THE INVENTION

It is, therefore, one objective of the present invention to provide an image reading apparatus for which a reduction in operating frequency can be prevented, and for which costs are minimized for measures taken to reduce the EMI accompanying the transmission of digital image data.

In order to solve the aforesaid object, the invention is characterized by having the following arrangement.

(1) An image reading apparatus comprising:

an image input unit for generating analog image data corresponding to optical density data for a document;

an A/D converter for converting, into digital image data, analog image data received by the image input unit;

an image processing unit for performing image processing based on the digital image data;

a control chip, including a controller for controlling the image input unit and the A/D converter, and a buffer storage unit for transmitting, to the image processing unit, the digital image data output by the A/D converter, wherein a power supply circuit for the controller and a power supply circuit for the buffer storage unit are independently provided; and a wiring member for electrically connecting the image processing unit and the control chip.

(2) The image reading apparatus according to (1), wherein the power voltage for the buffer storage unit is less than the power voltage for the controller.

(3) The image reading apparatus according to (1) further comprising:

a waveform control member for attenuating the signal waveform of the power supply circuit for the buffer storage unit.

(4) The reading apparatus according to (3), wherein the waveform control member includes a coil.

(5) The image reading apparatus according to (1), wherein the wiring member is a flexible flat cable.

(6) The image reading apparatus according to (1), wherein the image processing unit is provided for a case, the image input unit, the A/D converter and the control chip are mounted on a carriage movable with respect to the case.

(7) The image reading apparatus according to (1), wherein the wiring member includes a power feed line for the power supply circuit for the controller and a power feed line for the power supply circuit for the buffer storage unit.

(8) The image reading apparatus according to (7) further comprising a coil provided for the power feed line for the power supply circuit for the buffer storage unit.

DETAILED DESCRIPTION OF PREFERRED EMBODIMENTS

Figure 2:
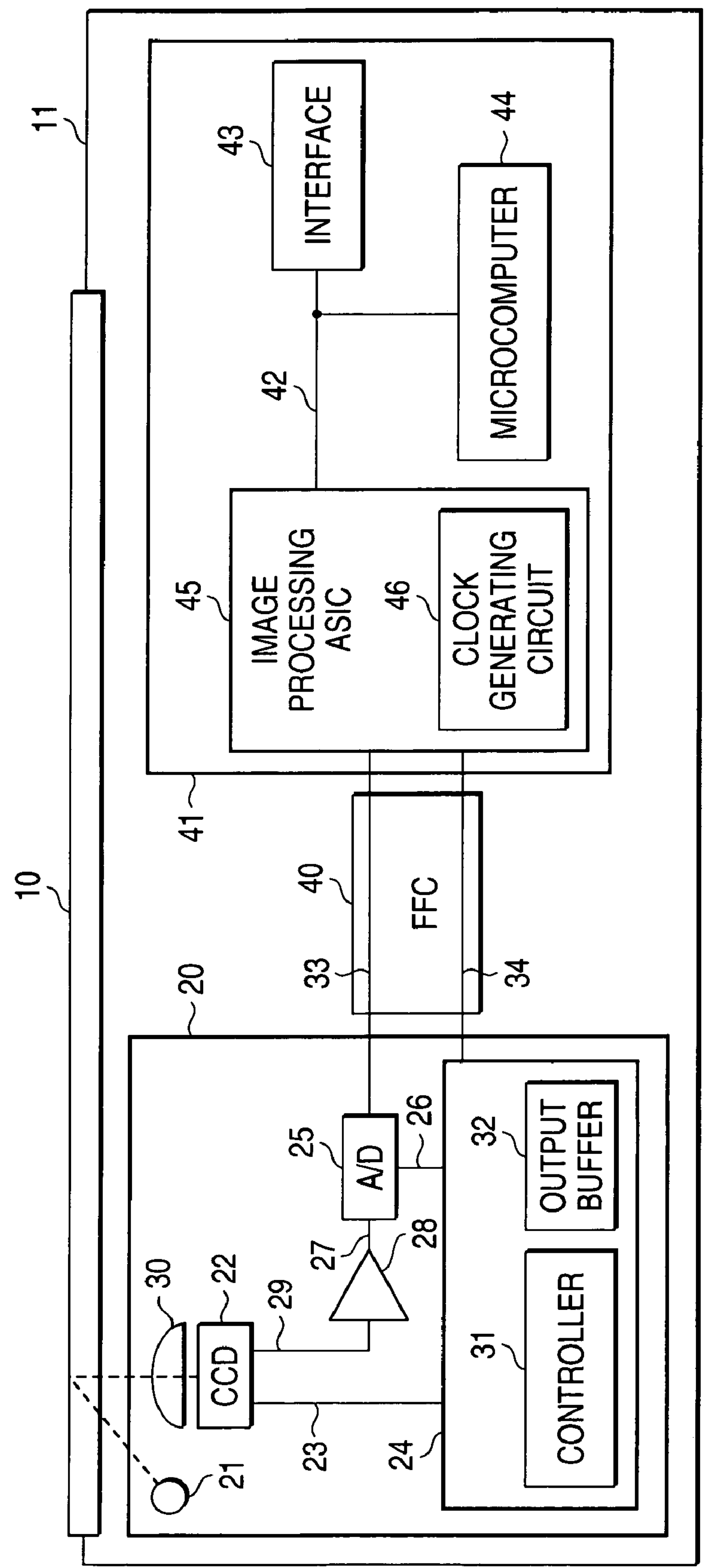
FIG. 2 is a specific cross-sectional view of the scanner according to the embodiment of the invention.

With referring to the drawings, an explanation will now be given for a scanner constituting an image reading apparatus according to one embodiment of the present invention. As shown in FIG. 2, a flatbed scanner according to the embodiment is includes a carriage 20 that reciprocates parallel to the face of a document.

Located on the periphery of a glass document table 10, which is provided on the upper face of a box shaped case 11, is a document guide (not shown) for positioning a document on the face of the glass document table 10. A white reference mark (not shown) having a uniform, highly reflective face is provided at the end of the glass document table 10.

The carriage 20 is supported by a guide rod (not shown) that is fixed to the case 11 and that permits the carriage 20 to be moved freely. A drive belt (which is not shown) is fixed to the carriage 20, and is rotated by a driving device (also not shown). A lamp 21, which is constituted by a rod shaped fluorescent lamp, is incorporated in the carriage 20, and emits light used to illuminate a document positioned on the glass document table 10. An optical system 30, which serves as an image input unit, is constituted by employing multiple mirrors and lenses, and forms an optical path extending from the document face to a CCD line sensor 22.

Figure 1:
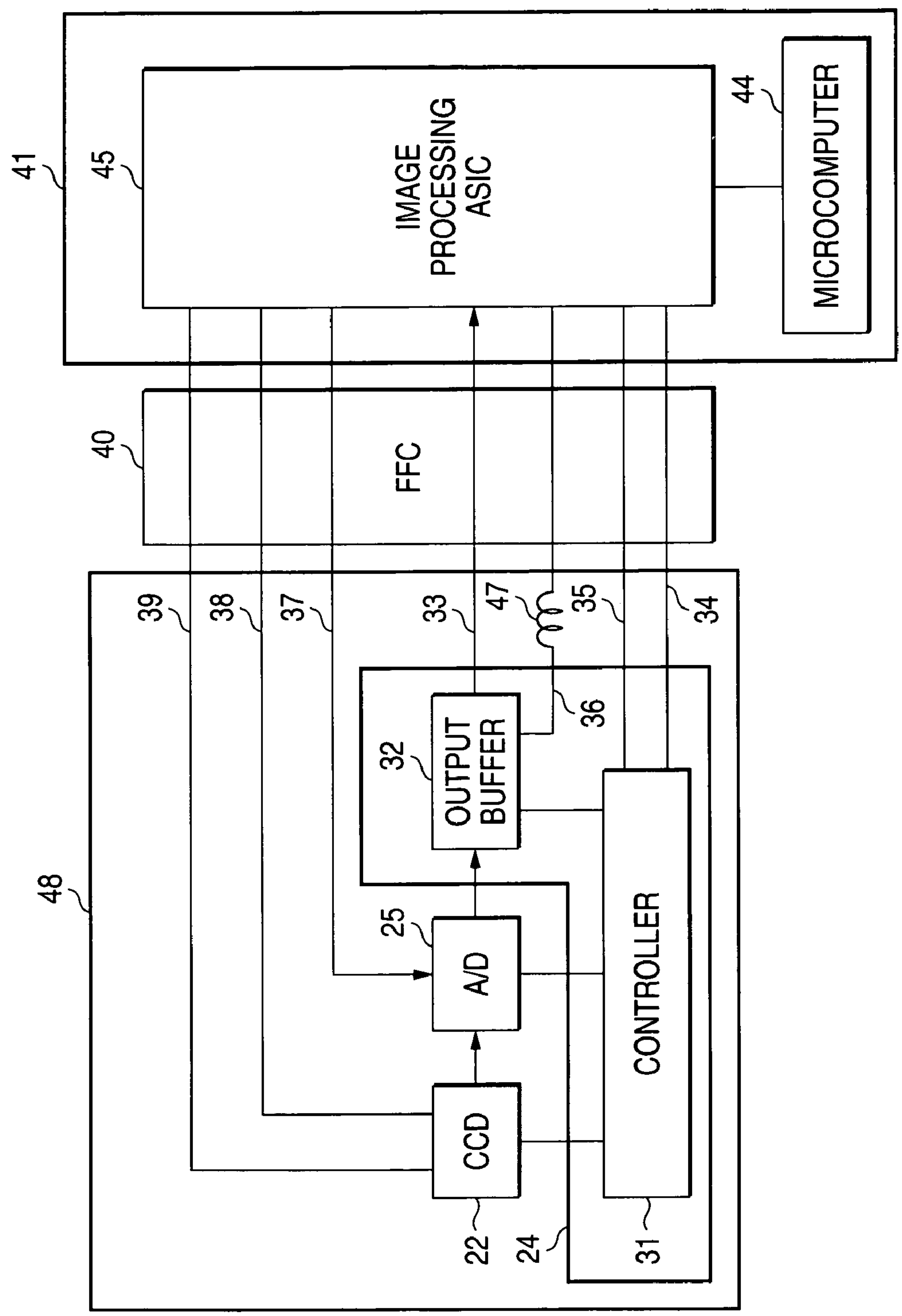
FIG. 1 is a block diagram showing a scanner according to one embodiment of the present invention.

As is shown in FIG. 1, the CCD line sensor 22 that serves as the image input unit is provided for a substrate 48, which is fixed to the carriage 20. The CCD line sensor 22 accumulates charges that are consonant with the light quantity received by all light receiving elements, and outputs the accumulated charges to an amplifier 28 in accordance with a control signal, such as a shift pulse received from a controller 31. A CCD having a color output can also be employed as the CCD line sensor 22, which includes multiple photo-electric conversion elements, a transfer gate, an analog shift register and a charge voltage converter. The charges accumulated by the photo-electric conversion elements are transmitted to the analog shift register in accordance with the shift pulse received by the transfer gate. By varying the shift pulse interval, the time allocated for the accumulation of charges at the photo-electric conversion elements can be changed, and the transfer of the charges to the analog shift register can be performed at the same time by all the photo-electric conversion elements. The charges so transmitted to the analog shift register are sequentially transferred to the charge voltage converter, which then changes the charge to a voltage. The shift pulse interval, i.e., the charge accumulation time for the photo-electric conversion element, is controlled by a computer program stored in a micro-computer 44.

An A/D converter 25, which is provided for the substrate 48, samples an analog image signal received from the CCD line sensor 22, and outputs the obtained 256 digital image signals. For sampling the analog image signal, the A/D converter 25 employs a sampling pulse received from the controller 31.

Figure 3:
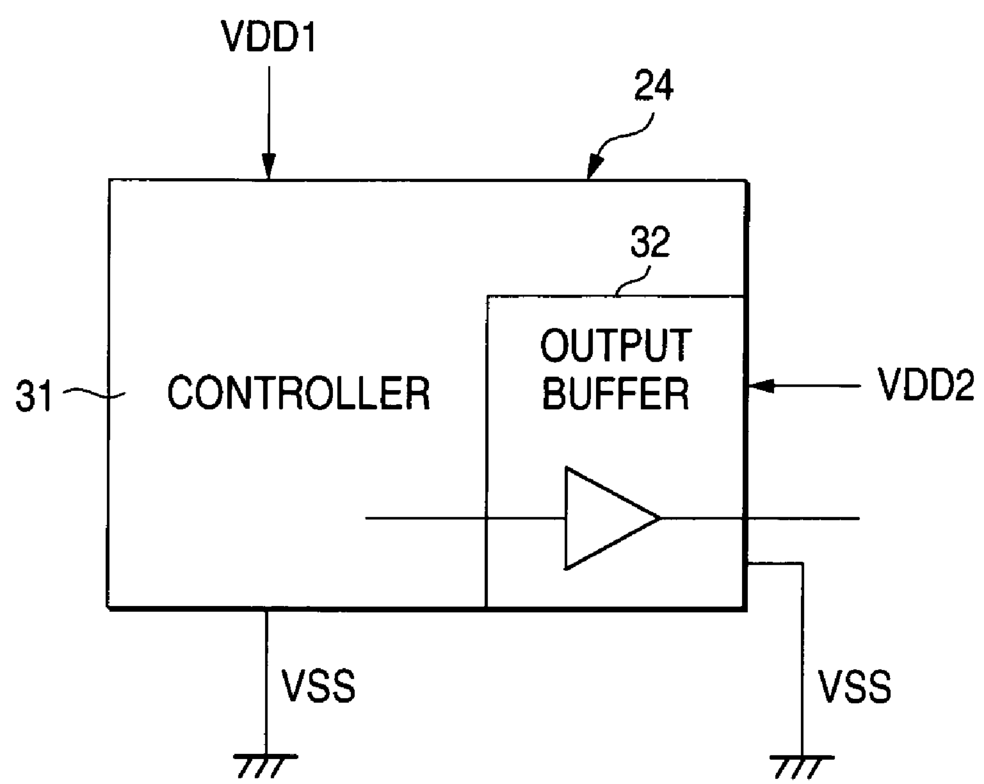
FIG. 3 is a block diagram showing a control chip according to the embodiment of the invention.
Figure 4:
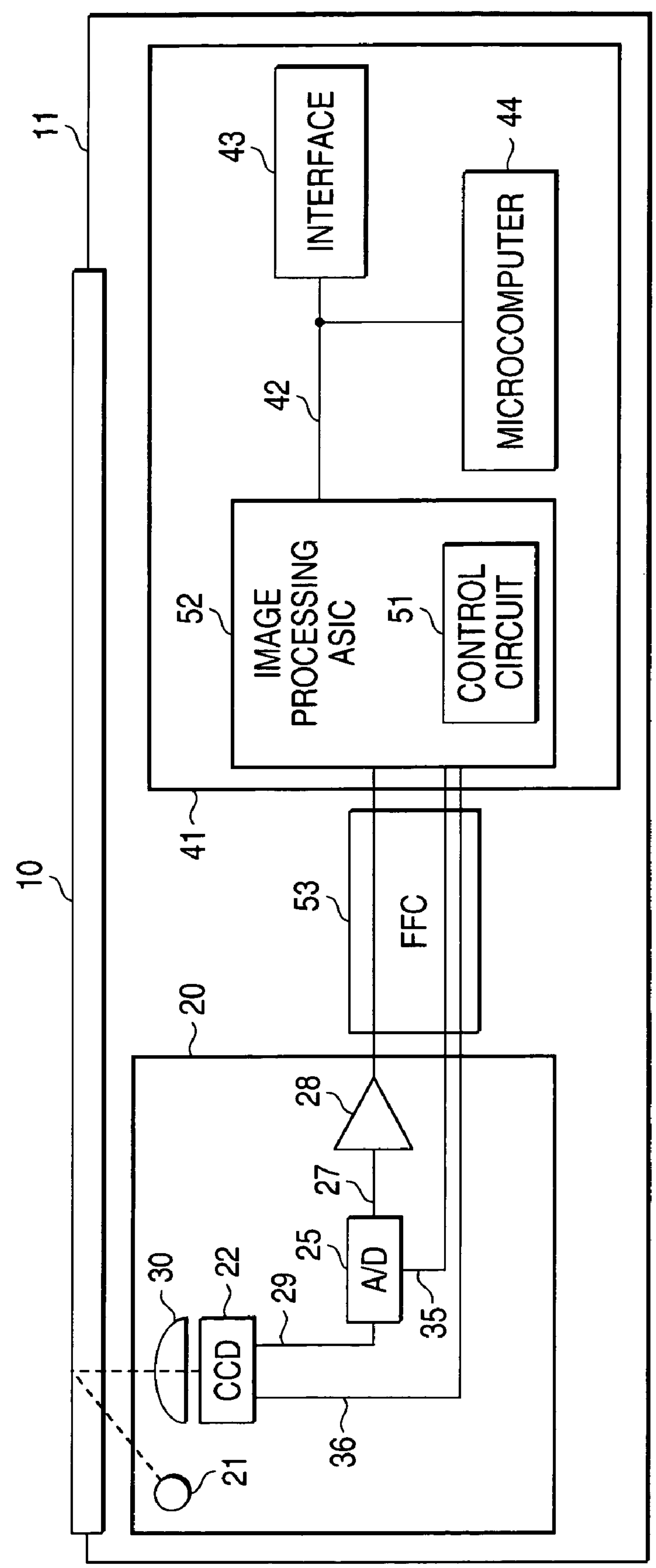
FIG. 4 is a specific cross-sectional view of a conventional scanner.

A control chip 24, formed of a single chip, is provided for the substrate 48. The control chip 24 constitutes an integrated circuit that includes the controller 31 and an output buffer 32 as a buffer storage unit. The control chip 24 receives two types of power from an image processing ASIC 45 along power feed lines 35 and 36. As shown in FIG. 3, the controller 31 and the output buffer 32 include independent power supply circuits, while two independent power terminals, i.e., the power terminal for the controller 31 and the power terminal for the output buffer 32 (neither of which is shown), are provided for the control chip 24. The power feed lines 35 and 36 are connected to these two power terminals. The power voltage for the controller 31 is 5 V, and the power for the output buffer 32 voltage is 3.3 V. Since the power voltage for the output buffer 32 is lower than the power voltage for the controller 31, the amplitude of an image digital signal transmitted by the output buffer 32 to the image processing ASIC 45 can be reduced, and the EMI produced by this signal can be suppressed. Furthermore, since the power voltage for the output buffer 32 can be lowered without reducing the power voltage for the controller 31, an adequate power voltage for controlling the CCD 22 and the A/D converter 25 is ensured, while the EMI produced by the image digital signal can be suppressed.

In this embodiment, two types of power are supplied from outside of the control chip 24. However, a single type of power may be supplied from outside the control chip 24, and the internal regulator of the control chip 24 may be employed to reduce the power voltage for the output buffer 32 so that it is lower than the power voltage at the controller 31.

The controller 31 generates a secondary clock pulse of 96 MHz, and employs the secondary clock pulse to generate a shift pulse and a reset pulse that it outputs to the CCD line sensor 22 and the A/D converter 25. For the generation of the secondary clock pulse, a PLL circuit in the controller 31 is employed to multiply by 16 the primary clock pulse received by the controller 31. It should be noted that the frequency of the secondary clock pulse only need to be determined in accordance with the functions of the CCD line sensor 22 and the A/D converter 25. As the frequency of the secondary clock pulse goes higher, a control signal having a narrower pulse width is generated, and as the pulse width of the control signal becomes narrower, the CCD line sensor 22 and the A/D converter can be operated at a higher speed. These signals generated by the controller 31 are transmitted to the CCD line sensor 22 along five control lines 23, and are transmitted to the A/D converter 25 along four control lines 26. As described above, since the controller 31 multiplies the frequency of the clock pulse, the CCD line sensor 22 and the A/D converter 25 can be operated at high speeds.

Since the transmission paths along data lines 27 and 29 in FIG. 2 are shorter than data line 33 for an FFC 40, less noise may enter and less signal waveform deterioration occurs along the data lines 27 and 29 than along the data line 33. Therefore, an analog image signal output by the CCD line sensor 22 is precisely converted into a digital image signal. Further, since the transmission paths along the control lines 23 and 26 are shorter than a control line 34 for the FFC 40, during the transmission of a control signal having a small pulse width and having the sharp leading and trailing edges of the pulse, EMI noise seldom occurs along the control lines 23 and 26 as compared with the control line 34.

The output buffer 32 is constituted by multiple flip-flop circuits located along the data lines 33, and the output buffer 32 enhances the driving capacity of a digital electric signal output by the A/D converter 25. In addition, since the digital image data obtained through the sampling performed by the A/D converter 25 are temporarily stored in the output buffer 32, and since the timing for transmitting the signal to the data lines 33 of the FFC is adjusted, the peak value of the EMI noise is reduced.

As is shown in FIG. 1, for the output buffer 32 a coil 47 is provided as a waveform control member along a power feed line 36. The coil 47 may be located either inside or outside the control chip 24; however, it is preferable that the coil 47 be located as near as possible to the output buffer 32. It should be noted that instead of the coil 47, a resistor maybe employed as the waveform control unit. Since the waveform control unit, such as the coil 47, is provided for the power supply system of the output buffer 32, the waveform of the digital image signal transmitted by the output buffer 32, through the FFC 40, to the image processing ASIC 45 can be attenuated. Since the power supply system for the output buffer 32 and the power supply system for the controller 31 are independent of each other, even when the waveform control member, such as the coil 47, is provided for the power supply system for the output buffer 32, the waveform of the control signal that is output by the controller 31 to the CCD 22 and the A/D converter 25 is not attenuated. Therefore, the controller 31 can employ a control signal having a high frequency to drive the CCD 22 and the A/D converter 25 at a high speed.

When one type of power is supplied from outside the control chip 24, and the internal transformer in the control chip 24 is employed to reduce the power voltage of the output buffer 32 so that it is lower than the power voltage at the controller 31, the coil 47 must be provided at a power supply circuit that is independent of the power supply circuit of the controller 31, and that has a lower power voltage than that of the controller 31.

As shown in FIG. 1, the eight-bit width data line 33, the control line 34 and the power feed lines 35, 36, 37, 38 and 39 are provided for the FFC 40. The digital image signal, of eight bits, is transmitted from the A/D converter 25 to the image processing ASIC 45 along the data line 33. When the CCD line sensor 22 outputs color image data, image signals for R (Red), G (Green) and B (Blue) are transmitted to the image processing ASIC 45 in a time sharing manner. The primary clock pulse is transmitted by the image processing ASIC 45 to the controller 31 along the control line 34. The two ends of the FFC 40 are secured to a connector (not shown) provided for the substrate 48 and a connector (also not shown) provided for a main substrate 41. The length of the FFC 40 is sufficient for the carriage 20 to reciprocate, within a distance of about 30 cm, parallel to the document glass table 10.

As is shown in FIG. 2, the main substrate 41 is fixed to the case 11. The image processing ASIC 45, an interface 43 and the micro-computer 44, which are interconnected by a bus 42, are mounted on the main substrate 41.

The image processing ASIC 45, which serves as an image processing unit, compares white reference data, which is obtained by scanning a white reference before the reading is started, with black reference data that have been stored in advance, corrects variances in the sensitivity of each element in the CCD line sensor 22 and variances in the quantity of light emitted by the lamp 21 in the main scanning direction, and performs various other processes, such as gamma correction and color correction. The image processing ASIC 45 includes a clock generator 46, which generates the primary clock pulse of 6 MHz that it thereafter transmits to the controller 31.

The interface 43 is used to connect a host computer (not shown) to the scanner. The micro-computer 44 includes a CPU, a RAM and a ROM, and provides overall control for the entire scanner, including the image processing ASIC 45, the interface 43 and the control chip 24.

The configuration of the scanner according to the embodiment of the invention has been explained. The operation of this scanner will now be described. Upon receiving a read start command from the host computer 44, the micro-computer 44 executes a predetermined program employed to activate the scanner in the following manner.

Under the control of the micro-computer 44, the lamp 21 is turned on and the white reference data is obtained. Then, the carriage 20 is moved to a position corresponding to a reading origin by a driving device (not shown). The optical system 30 is used to form an image on the CCD line sensor 22 of a document positioned on the glass document table 10. The controller 31 generates the secondary clock pulse of 96 MHz, based on the primary clock pulse of 6 MHz that is output by the image processing ASIC 45, employs the secondary clock pulse to generate control signals, such as a shift pulse, and controls the CCD line sensor 22 based on these control signals. As the frequency of the control signal, such as the shift pulse, is high and the pulse width is narrow, the CCD line sensor 22 can be operated at a high speed.

Synchronized with the shift pulse, a charge is obtained from the CCD line sensor 22 and is transmitted as an analog image signal to the amplifier 28. For each line, the CCD line sensor 22 transmits a charge to the shift register, and each time a charge has been so transmitted, the driving device moves the carriage 20 to the next reading line. Based on a sampling pulse received from the controller 31, the analog image signal amplified by the amplifier 28 is sampled by the A/D converter 25 and is converted into a digital image signal of eight bits. As the sampling pulse frequency is high and the pulse width is narrow, only a short cycle is required to sample the analog image signal output by the CCD line sensor 22. Subsequently, the digital image signal is temporarily stored in the output buffer 32, and is then transmitted to the data lines 33 at transfer timings that differ for the individual data lines. Finally, the image processing ASIC 45 performs shading correction or gamma correction for the received digital image data and transmits the obtained data, through the interface 43, to the host computer.

According to the scanner of this embodiment, since as is shown in FIG. 3 the power supply circuit for the controller 31 and the power supply circuit for the output buffer 32 are independently provided, the power voltage for the output buffer 32 need only be reduced to obtain a corresponding reduction in the amplitude of the signal waveform of the digital image data transmitted along the FFC 40, without the operation of the controller 31 being adversely affected. In addition, so long as the coil 47 is located at one position in the internal power supply circuit of the control chip 24, or the external circuit thereof near its power supply circuit, the signal waveform for the digital image data transmitted along the FFC 40 can be attenuated. Therefore, a high operating frequency can be maintained, and the costs incurred by the reduction of the EMI that accompanies the transmission of digital image data can be minimized.

What is claimed is:

1. An image reading apparatus comprising:

- an image input unit for generating analog image data corresponding to optical density data for a document;
- an A/D converter for converting, into digital image data, analog image data received by the image input unit;
- an image processing unit for performing image processing based on the digital image data;
- a control chip, including
  - a controller for controlling the image input unit and the A/D converter, and
  - a buffer storage unit for transmitting, to the image processing unit, the digital image data output by the A/D converter, wherein a power supply circuit for the controller and a power supply circuit for the buffer storage unit are independently provided; and
- a wiring member for electrically connecting the image processing unit and the control chip.

2. The image reading apparatus according to claim 1, wherein the power voltage for the buffer storage unit is less than the power voltage for the controller.

3. The image reading apparatus according to claim 1 further comprising:

- a waveform control member for attenuating the signal waveform of the power supply circuit for the buffer storage unit.

4. The reading apparatus according to claim 3, wherein the waveform control member is a coil.

5. The image reading apparatus according to claim 1, wherein the wiring member is a flexible flat cable.

6. The image reading apparatus according to claim 1, wherein

- the image processing unit is provided for a case,
- the image input unit, the A/D converter and the control chip are mounted on a carriage movable with respect to the case.

7. The image reading apparatus according to claim 1, wherein the wiring member includes a power feed line for the power supply circuit for the controller and a power feed line for the power supply circuit for the buffer storage unit.

8. The image reading apparatus according to claim 7 further comprising a coil provided for the power feed line for the power supply circuit for the buffer storage unit.

* * * * *